United States Patent
Bredthauer et al.

(10) Patent No.: US 6,749,663 B2
(45) Date of Patent: Jun. 15, 2004

(54) ULTRA-COARSE, MONOCRYSTALLINE TUNGSTEN CARBIDE AND A PROCESS FOR THE PREPARATION THEREOF, AND HARDMETAL PRODUCED THEREFROM

(75) Inventors: Jörg Bredthauer, Bonn (DE); Benno Gries, Wolfenbüttel (DE); Bernhard Szesny, Langelsheim (DE)

(73) Assignee: H.C. Starck GmbH, ImSchleeke (DE)

( * ) Notice: Subject to any disclaimer, the term of this patent is extended or adjusted under 35 U.S.C. 154(b) by 0 days.

(21) Appl. No.: 09/944,038

(22) Filed: Aug. 30, 2001

(65) Prior Publication Data

US 2002/0078794 A1 Jun. 27, 2002

(30) Foreign Application Priority Data

Sep. 6, 2000 (DE) .......................................... 100 43 792

(51) Int. Cl.⁷ ................................................. B22F 9/20
(52) U.S. Cl. ............................. 75/363; 75/368; 75/369; 148/237; 423/440
(58) Field of Search ........................ 75/363, 368, 369; 148/237; 423/440

(56) References Cited

U.S. PATENT DOCUMENTS

| | | | |
|---|---|---|---|
| 1,602,527 A | * 10/1926 | Benjamin ..................... | 75/363 |
| 3,850,614 A | 11/1974 | Bleecker ................... | 75/0.5 BB |
| 4,402,737 A | 9/1983 | Kronenwetter et al. .. | 75/0.5 BB |
| 4,664,899 A | 5/1987 | Kimmel et al. ............ | 423/440 |
| RE32,612 E | * 2/1988 | Gomes et al. ................ | 423/53 |
| 4,983,354 A | 1/1991 | Reeder et al. ................ | 419/11 |
| 5,071,473 A | 12/1991 | Reeder et al. ................ | 75/240 |
| 5,505,902 A | 4/1996 | Fischer et al. ................ | 419/10 |
| 5,529,804 A | 6/1996 | Bonneau et al. ............ | 427/217 |
| 5,734,960 A | 3/1998 | Patrician et al. ............. | 419/28 |
| 6,126,709 A | 10/2000 | Akermann et al. ........... | 75/240 |
| 6,524,366 B1 | * 2/2003 | Seegopaul et al. ............ | 75/351 |

OTHER PUBLICATIONS

R & H M, Sep. 1984, pp. 121–131, "Thermochemical Calculations on the Reduction of Tungsten (VI) Oxide with Sepcial Emphasis on Trace Element Behaviour" by Jan Qvick.

L. Smith Ed., "Phase Diagrams for Ceramists", vol. IV, The American Ceramic Soc., (Month Unavailable) 1981, figure 5444, pp. 232 and 233, IV. Four Oxides, Figure 5444.

Patent Abstracts of Japan, vol. 007, No. 244 (M–252), Oct. 28,1983 & JP 58 130206 A (Toukiyou Tungsten KK), Aug. 3, 1983 Zusammenfassung.

Patent Abstracts of Japan, vol. 009, No. 066 (C–271), Mär. 1985 & JP 59 200750 A (Komatsu Seisakusho KK), Nov. 14, 1984 zusammenfassung.

Zhang Junxi, R & HM Dec. 1988, pp. 224–228, Effect of Reduction and Carburization Temperatures of Tungsten Powder on WC–Phase Substructure and Mechanical Properties of WC–Co Cemented Carbide.

Chen Hongyu et al.: Proceedings of the First International Conf. On the Metallurgy and Materials of Tungsten, Titanium, Rare Earths and Antimony, Changsa, P.R. China, Nov. 1998, pp. 757–760, The Automatic Determination of Coarse Grain Size Using On–Line Micro–Computer Systems, Chen Hongyu, Wang Shumao and Hang Dacai.

R & HM Dec. 1988, pp. 201–205, Use of Oxygen Probes to Study and Control the Atmosphere During Reduction of Tungsten Oxide, Jan Qvick.

* cited by examiner

Primary Examiner—George Wyszomierski
(74) Attorney, Agent, or Firm—Godfried R. Akrolli; Diderico Van Eyl

(57) ABSTRACT

A process is described for the preparation of tungsten and/or molybdenum metal powder or carbide by reducing and optionally carburizing treatment of tungsten and/or molybdenum oxide powder in the presence of alkali metal compounds, wherein at least two alkali metal compounds are used in a ratio so that mixed alkali tungstate or molybdate potentially formed in an intermediate step ($(Li, Na, K)_2WO_z$, $(Li, Na, K)_2MoO_z$) has a melting point of less than 550° C., wherein z is from 3 to 4.

8 Claims, 2 Drawing Sheets

ULTRA-COARSE, MONOCRYSTALLINE TUNGSTEN CARBIDE AND A PROCESS FOR THE PREPARATION THEREOF, AND HARDMETAL PRODUCED THEREFROM

BACKGROUND

Hardmetals are to be regarded as a composite material wherein the monotungsten carbide (WC) phase acts as the hardness carrier. The brittleness of pure WC which is associated with the high degree of hardness is compensated for by the metallic binder phase (generally Co but also Fe and Ni and alloys thereof and optionally Cr). In the event of high binder contents, the mechanical abrasion resistance is not sufficient, and with low binder contents the mechanical strength obtained is inadequate. In practice, therefore, hardmetals are composed of 3 to 30 wt. % of Co, values of 5 to 12 wt. % being encountered most often. For a given binder content, hardness and toughness can be adjusted by way of the degree of dispersion of the WC phase in the sintered hardmetal (known as the Hall-Petch relation). The range of variation of the tungsten carbide powders used for this purpose is from 0.4 $\mu$m to 50 $\mu$m FSSS (ASTM B 330). The hardnesses which can be obtained in the sintered hardmetal are from 1950 to 850 kg/mm$^2$ HV$_{30}$ (Vickers hardness with a 30 kg load) with 10 wt. % of Co.

The object of the invention is to extend downwards the available hardness range of hardmetals with the same binder content. The background is that the specific wear behavior of hardmetal tools during cutting-type rock machining is evidently so that a monocrystalline structure which is as coarse as possible in the sintered hardmetal permits particularly long edge lives and hence high cutting rates without premature tool failure. Such applications are found in tunnel driving, borehole drilling and in mining (EP 0 819 777 A1).

The industrially established method of preparing tungsten carbide is the reduction of WO$_3$, tungstic acid or ammonium para-tungstate under hydrogen, initially to the metal powder followed by carburization. The tungsten metal powder obtained in this way is obtained in particle sizes from 0.3 $\mu$m to 50 $\mu$m, and the particle size may be adjusted within certain limits by means of the charge amount or bed height, moisture content of the hydrogen, reduction temperature and residence time. During the subsequent carburization of the tungsten metal powder thus obtained with solid carbon at temperatures of up to 2,200° C., this particle size remains substantially unchanged after work up. In order to obtain average particle sizes above about 12 $\mu$m FSSS, the range that can be achieved in the above production parameters during reduction is no longer sufficient.

U.S. Pat. No. 4,402,737 describes doping tungsten oxide with alkali chlorides, particularly with LiCl with which the highest FSSS values in the tungsten metal powder can be obtained. Polycrystalline powders are the development objective, however (column 1, line 22). Such tungsten metal powders, after carburization, lead to agglomerated composites of fine WC crystals which in turn leads to a higher degree of dispersion of the WC phase in the sintered hardmetal and hence to a comparatively high degree of hardness. Another disadvantage is that the gaseous HCl formed during reduction with hydrogen leads to increased corrosion in the plants used to separate the hydrogen from the water formed.

According to EP 0 819 777 A1, the fractionated classification of WC powders with a broad particle size distribution is proposed for the preparation of coarse, monocrystalline WC powders, e.g., by grinding followed by air classification. This separation can be achieved with sufficient accuracy and also leads to correspondingly satisfactory hardmetals with low hardnesses, but it entails a large amount of equipment and the production of coupled products. It is claimed that with this process (and an unconventional mixing of WC and cobalt metal powder by means of a complex pyrolysis process instead of conventional crushing and grinding) it is possible to obtain hardmetals which, with 6% of Co, have a Vickers hardness of 980 kg/mm$^2$ (EP 0 819 777 A1) and correspondingly good properties.

The object of the invention is to provide a method of preparation with a high yield for monocrystalline WC with an average particle size greater than 50 $\mu$m FSSS and sufficient purity, wherein the hardmetals produced in a correspondingly conventional manner (i.e. by crushing and grinding cobalt metal powder with the tungsten carbide) with a narrow particle size distribution of the WC should have a hardness of at most 850 HV$_{30}$ with 10 wt. % of Co or 980 HV$_{30}$ with 6% of Co. To this end, it is necessary to prepare a coarse-crystalline tungsten metal powder in the first instance.

SUMMARY OF THE INVENTION

The invention relates to a process comprising reducing a component selected from the group consisting of tungsten oxide powders and molybdenum oxide powders, in the presence of alkali metal compounds, and preparing tungsten powder, molybdenum powder, mixtures thereof, or a carbide; wherein at least two alkali metal compounds are used in a ratio so that mixed alkali tungstate or molybdate formed in an intermediate step ((Li, Na, K)$_2$ WO$_z$, (Li, Na, K)$_2$MoO$_z$) has a melting point of less than about 550° C., wherein the value of z is from 3 to 4. The invention also relates to a tungsten metal powder, a molybdenum metal powder, a tungsten carbide powder made by such a process. In one embodiment, the invention relates to a tungsten carbide powder with an average particle size of >50 $\mu$m FSSS.

DESCRIPTION OF THE FIGURES

These and other features, aspects, and advantages of the present invention will become better understood with reference to the following description and appended claims, where

DESCRIPTION

Figure 1:
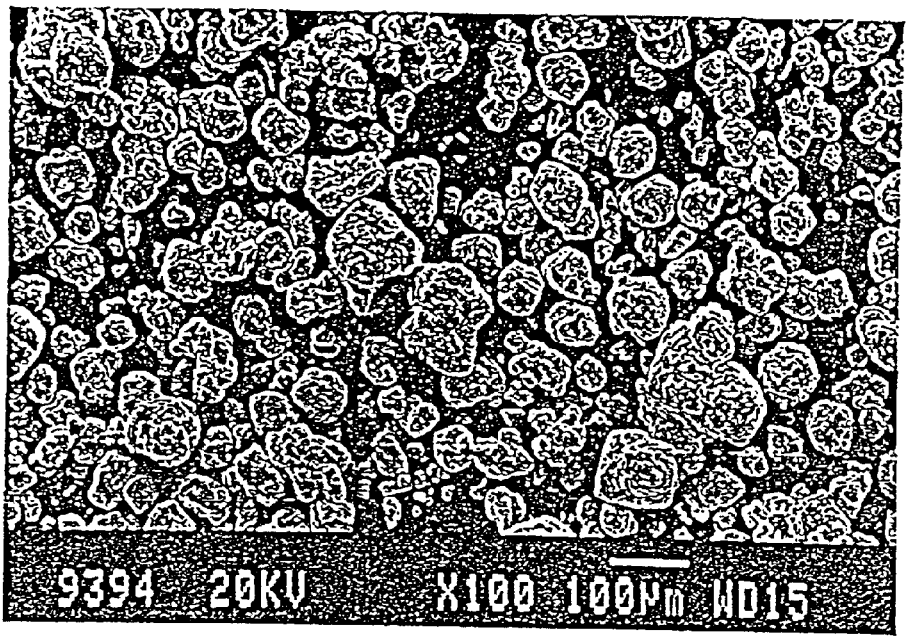
FIG. 1 is a copy of an SEM photograph of monocrystals made in accordance with the invention.

The invention relates to a process comprising reducing a component selected from the group consisting of tungsten oxide powders and molybdenum oxide powders, in the presence of alkali metal compounds, and preparing tungsten powder, molybdenum powder, mixtures thereof, or a carbide; wherein at least two alkali metal compounds are used in a ratio so that mixed alkali tungstate or molybdate formed in an intermediate step ((Li, Na, K)$_2$ WO$_z$, (Li, Na, K)$_2$MoO$_z$) has a melting point of less than about 550° C., wherein the value of z is from 3 to 4. The invention also relates to a tungsten metal powder, a molybdenum metal powder, a tungsten carbide powder made by such a process. In one embodiment, the Invention relates to a tungsten carbide powder with an average particle size of >50 µm FSSS.

The invention starts out with the idea that crystal growth in the case of material transport is promoted by liquid phase diffusion as opposed to solid phase and gas phase diffusion. This is because higher supersaturations are required for material transport via solid phase and gas phase diffusion than with transport via the liquid phase. Higher supersaturations lead, however, to increased nucleation, so smaller crystals are formed on average.

The known reduction of tungsten oxide with the use of lithium as the doping agent seems to take place according to the following reaction equation:

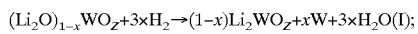
$(Li_2O)_{1-x}WO_z+3xH_2 \rightarrow (1-x)Li_2WO_z+xW+3xH_2O(I);$

The value of Z is from 3 to 4. The melting point of lithium tungstate is about 740° C. During the reduction process, however, a melt controlling the material transport may be formed insufficiently, if at all, evidently due to the increase in the melting point due to the tungsten oxide dissolved in the lithium tungstate (non-stoichiometric lithium tungstates).

The present invention starts out with the idea that crystal growth during the reduction of tungsten oxide can be favorably influenced in terms of the development of coarser crystals if intermediate phases with a sufficiently low melting point are made available.

It was found that this can be achieved if mixed alkali compounds are used during reduction.

The present invention provides, therefore, a process for the preparation of tungsten metal powder or carbide by reducing and optionally carburizing treatment of tungsten powder in the presence of alkali metal compounds, which is wherein at least two alkali metal compounds are used in a ratio so that mixed alkali tungstate formed in an intermediate step ((Li, Na, K)$_2$ WO$_Z$) has a melting point of less than about 500° C.

The mixed alkali compounds are used preferably in amounts from, in total, from about 0.2 mole % to about 1.5 mole %, based on the tungsten oxide.

A mixed alkali compound of a sodium and a lithium compound with a molar ratio of sodium to lithium of from about 0.9 to about 1.26 is preferred. A mixed alkali compound containing sodium, lithium and potassium compound in which the potassium compound replaces the sodium and/or lithium in the above-mentioned molar ratio up to a total potassium content of about 40 mole %, is particularly preferred, a value from about 10 mole % to about 30 mole % also being preferred.

The optimum composition of the mixed alkali compound should lie in the region of the eutectic of the ternary mixture of lithium, sodium and potassium ortho-tungstates with a composition of about 46.4 mole % of lithium component, 36.3 mole % of sodium component and 17.4 mole % of potassium component with a melting point of 424° C. (see L. Smith Ed., "Phase Diagrams for Ceramists", Vol. IV, The American Ceramic Soc. (1981), FIG. 5444).

The mixed alkali compounds may be used as alkali oxides carbonates, tungstates, hydroxides or halides. From the point of view of the corrosive behavior of chlorides, the high melting point of oxides and the unfavorable evaporation behavior of hydroxides, carbonates and tungstates are preferred, carbonates being particularly preferred because they are more readily available.

The alkali compounds may be used as mixtures of alkali compounds or as pre-alloyed (e.g., obtained by co-precipitation) mixed alkali compounds.

It is not important for the process according to the invention that an intermediate phase with a melting point of less than 520° C. is actually formed. What is important is the ratio of sodium component and lithium component, optionally substituted by a potassium component. Liquid phases occurring during reduction are likely to have a higher but still sufficiently low melting point in view of a stoichiometric alkali deficit in the mixed alkali tungstate formed.

In order to carry out the process according to the invention, tungsten oxide, preferably yellow WO$_3$ is mixed preferably in the dry state with the mixed alkali compound or alkali compound mixture, heated under a reducing gas to a reduction temperature of about 950° C. to 1,200° C., the mixed alkali tungstates being formed in the temperature range from about 600° C. to 850° C. The temperature during the flow of reducing gas is then maintained for 5 to 20 hours until complete reduction to the metal, and the metal powder is cooled. Atmospheres containing hydrogen and/or carbon monoxide and/or hydrocarbon are suitable as a reducing gas.

The tungsten metal powder obtained, optionally after deagglomerating grinding, with average particle sizes of >20 µm, preferably >40 µm, particularly preferably from 50 µm to 70 µm, may be used advantageously as such for the preparation of sintered molded parts by powder metallurgy.

The tungsten metal powder is preferably mixed intimately with carbon, particularly carbon black and carburized in an inherently known manner.

Although no experimental experience is available yet on the reduction of molybdenum oxide (melting point MoO$_3$ 795° C.), it is expected that the crystallisation behavior during reduction to molybdenum metal and the reduction temperature may be favorably influenced in view of the similarity of the ternary diagram of lithium molybdate, sodium molybdate and potassium molybdate.

The invention is further described in the following illustrative examples in which all parts and percentages are by weight unless otherwise indicated.

EXAMPLES

Example 1

Example According to the Invention

Coarse, monocrystalline tungsten carbide was prepared as follows: 50 kg of yellow WO$_3$ (H.C. Starck, hardmetal grade) were mixed with 0.12 kg of a mixed carbonate (prepared by melting a mixture of 0.032 kg of potassium carbonate, 0.046 kg of lithium carbonate and 0.042 kg of sodium carbonate, followed by quenching and pulverisation) by mixing in a positive mixer. The tungsten oxide prepared in this way and doped with a total of 0.58 mole % of alkali metal carbonates was reduced to tungsten metal powder at 1,150° C. under hydrogen with a residence time of 10 h. The average particle size of the tungsten metal powder thus prepared was >50 µm according to ASTM B 330. The tungsten metal powder was mixed with carbon black in a positive mixer and carburized at 2,250° C. It was then crushed using a jaw crusher and sieved over 400 µm. The oversize was again worked up by means of the jaw crusher. The FSSS determination gave 67 µm, the double weighed sample being used for the determination, and the measured value obtained being multiplied by a correction factor which depends on the porosity and is calculated according to ASTM B330. According to the SEM photograph, the WC was comparatively coarse, had a greatly reduced proportion of fines and relatively large monocrystals up to a maximum of 100 μm (FIG. 1).

After 15 h wet grinding in hexane with 6 wt. % of cobalt metal powder (H.C. Starck, "Co MP II") using a ball mill (material:balls=1:2 parts by weight), a hardness of 974 kg/mm$^3$ (HV$_{30}$) was obtained after vacuum sintering at 1,420° C. Prolonging the grinding time to 20 h led to an increase in hardness to 1,034 kg/mm$^2$. The porosity was A02B02 and A02B00 respectively according to ISO 4505.

Figure 2:
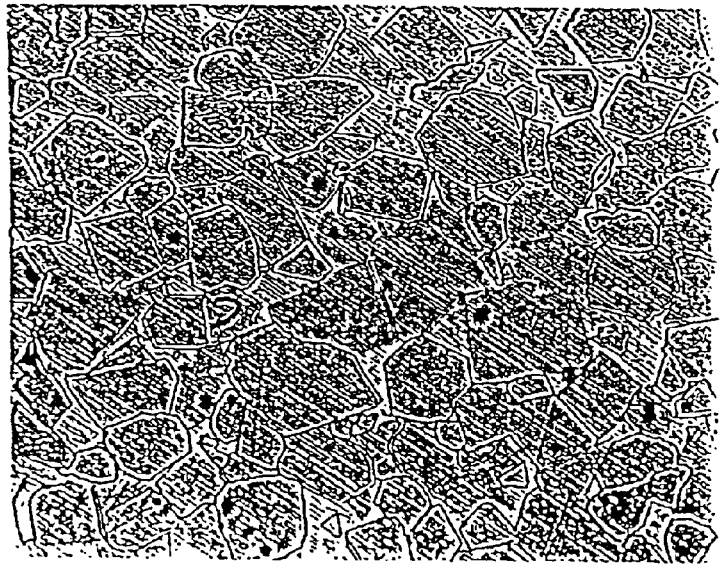
FIG. 2 is a copy of an SEM photograph of a hardmetal made in accordance with the invention.

After 10 h wet grinding in hexane with 9.5 wt. % of cobalt (other conditions as above), a hardness of 830 kg/mm$^2$ was obtained after vacuum sintering at 1,420° C. The residual porosity was A02B00 according to ISO 4505. The hardmetal had a very coarse but uniform structure (FIG. 2).

Example 2

Example According to the Invention

The WC powder was prepared as described in Example 1 except that a mixture of individual alkali carbonates was used. The FSSS of the tungsten carbide thus prepared was 53 μm (determination as in Example 1).

Example 3

Comparison Example

Figure 3:
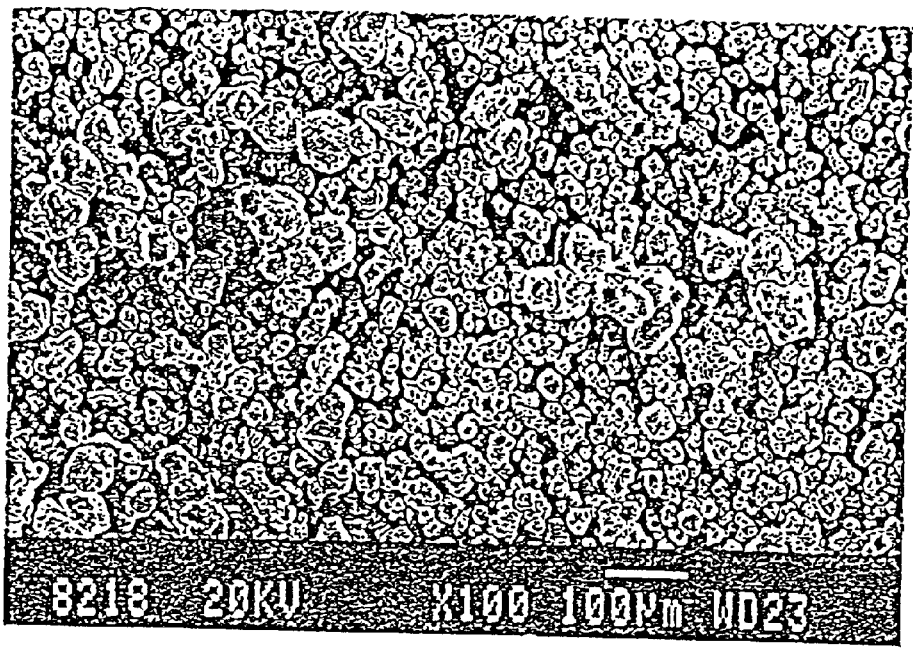
FIG. 3 is a copy of a SEM photograph of a monotungsten carbide (WC) that is not made in accordance with the invention.

WO$_3$ was homogenized with 0.1 wt. % of lithium carbonate (corresponding to 0.32 mole % of alkali carbonate) in a positive mixer and reduced for 10 h at 1,150° C. under hydrogen. The FSSS was 40 μm. After mixing with carbon black, carburization was carried out at 2,250° C. The tungsten carbide was worked up by means of a jaw crusher and sieved over 400 μm. The FSSS determination of the tungsten carbide gave 50 μm. According to the SEM photograph, the WC had a broad particle size distribution and exhibited an elevated proportion of fines and monocrystals up to 50 μm (FIG. 3).

Figure 4:
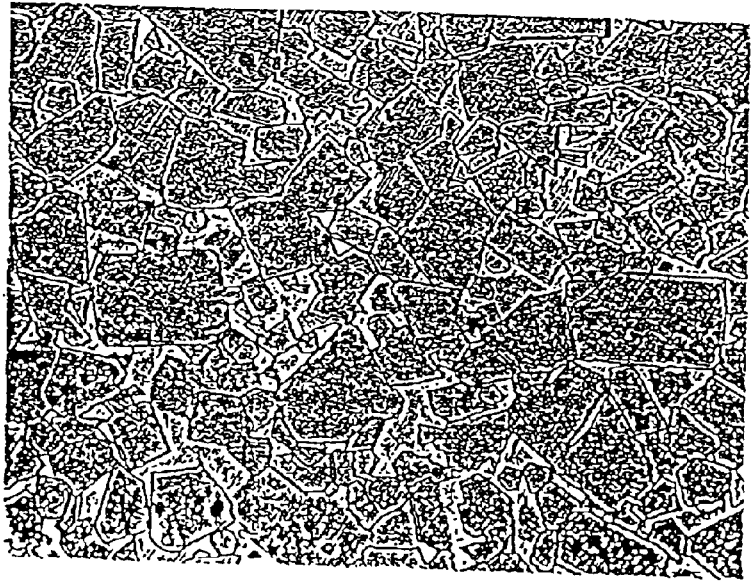
FIG. 4 is a copy of a SEM photograph of a hardmetal structure that is not made in accordance with the invention.

The hardmetal test with 9.5% of cobalt (carried out as in Example 1) gave a Rockwell hardness of 84.3 HRA and a Vickers hardness of 897 kg/mm$^2$. The hardmetal structure was coarse but non uniform with a comparatively large proportion of fines (FIG. 4).

Although the present invention has been described in detail with reference to certain preferred versions thereof, other variations are possible. Therefore, the spirit and scope of the appended claims should not be limited to the description of the versions contained therein.

What is claimed is:

1. A process comprising reducing a component selected from the group consisting of tungsten oxide powders and molybdenum oxide powders, in the presence of alkali metal compounds, and preparing tungsten powder, molybdenum powder, mixtures thereof, or a carbide;

wherein at least two alkali metal compounds are used in a ratio so that mixed alkali tungstate or molybdate formed in an intermediate step ((Li, Na, K)$_2$ WO$_z$, (Li, Na, K)$_2$MoO$_z$) has a melting point of less than about 550° C., wherein the value of z is from 3 to 4, and wherein the alkali compounds are used as a mixed salt.

2. The process of claim 1, wherein the component selected from the group consisting of tungsten oxide powders and molybdenum oxide powders is subjected to a carburizing treatment.

3. The process according to claim 1, wherein the alkali compounds are used in a total amount that ranges from about 0.2 to about 1.5 mole %, based on the tungsten and/or molybdenum oxide.

4. The process according to claim 1, wherein the alkali compounds have a molar ratio of Na to Li of from about 0.9 to about 1.26 and wherein, in the further presence of a potassium compound, the potassium replaces Na and/or Li up to about 40 mole %.

5. The process according to claim 1, wherein the alkali compounds are selected from the group consisting of oxides, hydroxides, carbonates, tungstates and molybdates.

6. The process according to claim 1, wherein the tungsten oxide powder is WO$_3$ and the molybdenum oxide powder is MoO$_3$.

7. The process according to claim 1, wherein the tungsten oxide powder is WO$_2$ and the molybdenum oxide powder is MoO$_2$.

8. The process according to claim 1, wherein the reducing treatment is carried out in an atmosphere containing hydrogen and/or carbon monoxide and/or hydrocarbon.

* * * * *